US012663940B2

(12) United States Patent
Chen et al.

(10) Patent No.: US 12,663,940 B2
(45) Date of Patent: Jun. 23, 2026

(54) SDS LOCAL DATA PATH OPTIMIZATION SYSTEM

(71) Applicant: Dell Products L.P., Round Rock, TX (US)

(72) Inventors: Xiangping Chen, Sherborn, MA (US); Andrew Butcher, Cedar Park, TX (US); Shyamkumar T. Iyer, Cedar Park, TX (US); Xunce Zhou, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/423,480

(22) Filed: Jan. 26, 2024

(65) Prior Publication Data

US 2025/0244916 A1 Jul. 31, 2025

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01)
(58) Field of Classification Search
CPC ....... G06F 3/0659; G06F 3/0604; G06F 3/067
See application file for complete search history.

(56) References Cited

U.S. PATENT DOCUMENTS

| 10,425,473 | B1 * | 9/2019 | Patel | .................... H04L 67/1097 |
| 10,680,951 | B2 | 6/2020 | Tönsing et al. | |
| 2007/0055838 | A1 * | 3/2007 | Mitsuoka | .............. G06F 3/0632 711/164 |
| 2008/0140971 | A1 * | 6/2008 | Dankel | ............... G06F 12/0284 711/E12.001 |
| 2020/0201575 | A1 * | 6/2020 | Mizrahi | ................ G06F 3/0611 |
| 2023/0409243 | A1 * | 12/2023 | Markuze | ............. H04L 67/1097 |

* cited by examiner

*Primary Examiner* — Kalpit Parikh
(74) *Attorney, Agent, or Firm* — Joseph Mencher

(57) ABSTRACT

A Software Defined Storage (SDS) system includes a memory system, an SDS client subsystem that is coupled to the memory system, and an SDS server subsystem that is coupled to the memory system. The SDS server subsystem establishes a first Transmission Control Protocol/Internet Protocol (TCP/IP) connection with the SDS client subsystem, and determines that the SDS client subsystem and the SDS server subsystem share the memory system. The SDS server subsystem then receives a first data read request via the first TCP/IP connection from the SDS client subsystem, determines the first data read request is associated with data stored in the memory system, and provides a first data read response via the first TCP/IP connection, that is configured to cause the SDS client subsystem to read the data from the memory system.

20 Claims, 18 Drawing Sheets

302

RESOURCE
MANAGEMENT
SYSTEM
304

RESOURCE
SYSTEM
306a

RESOURCE
SYSTEM
306b

RESOURCE
SYSTEM
306c

LCS PROVISIONING SUBSYSTEM 300

402

RESOURCE SYSTEM 400

SCP
DEVICE
406

RESOURCE
DEVICE
404a

RESOURCE
DEVICE
404b

RESOURCE
DEVICE
404c

Figure 12:
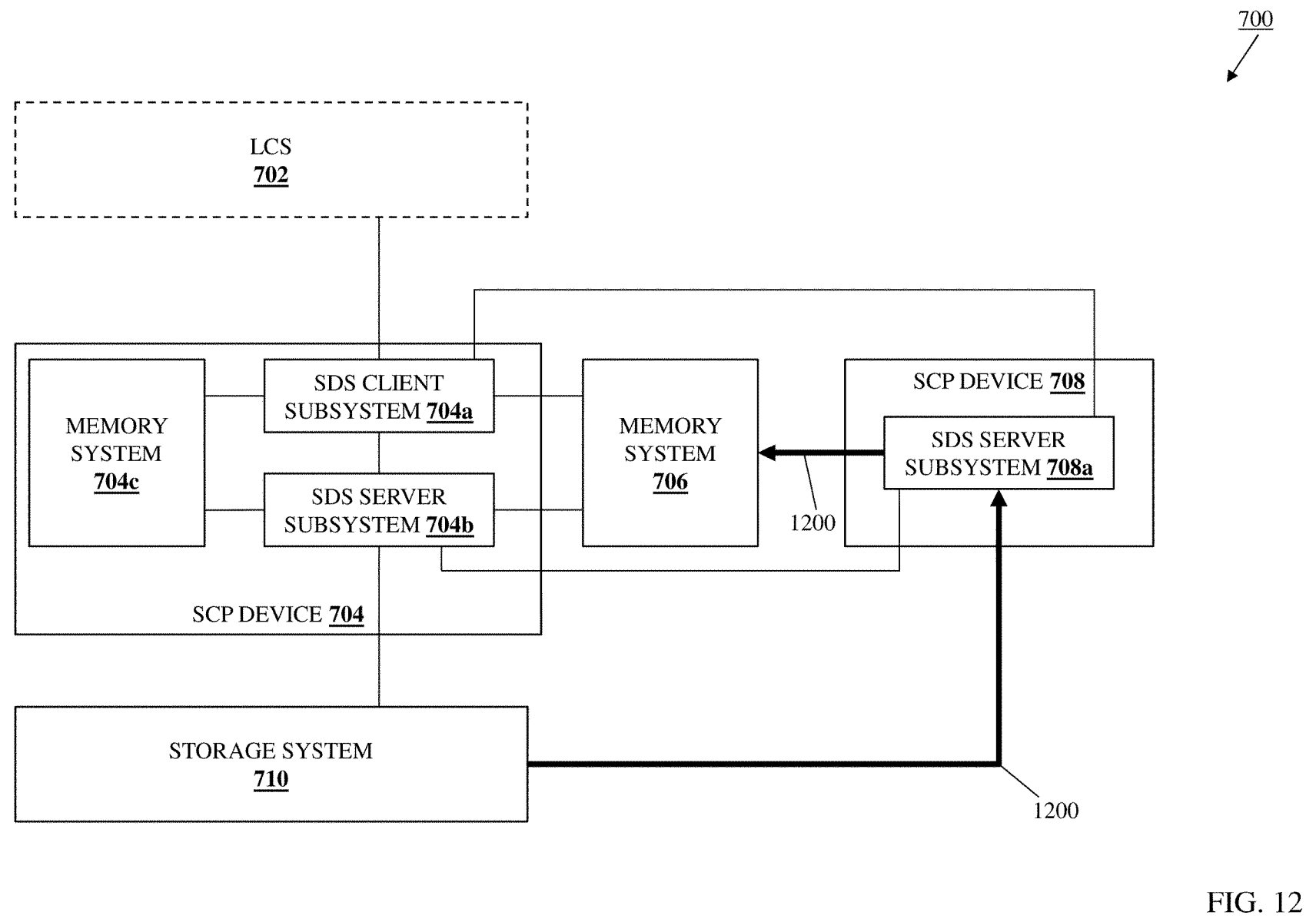

LCS
702

SCP DEVICE 708

SDS SERVER
SUBSYSTEM 708a

MEMORY
SYSTEM
706

1200

1200

SDS CLIENT
SUBSYSTEM 704a

SDS SERVER
SUBSYSTEM 704b

SCP DEVICE 704

MEMORY
SYSTEM
704c

STORAGE SYSTEM
710

700

LCS
702

SCP DEVICE 708

SDS SERVER
SUBSYSTEM 708a

MEMORY
SYSTEM
706

SDS CLIENT
SUBSYSTEM 704a

1300

SDS SERVER
SUBSYSTEM 704b

SCP DEVICE 704

MEMORY
SYSTEM
704c

STORAGE SYSTEM
710

Figure 14:
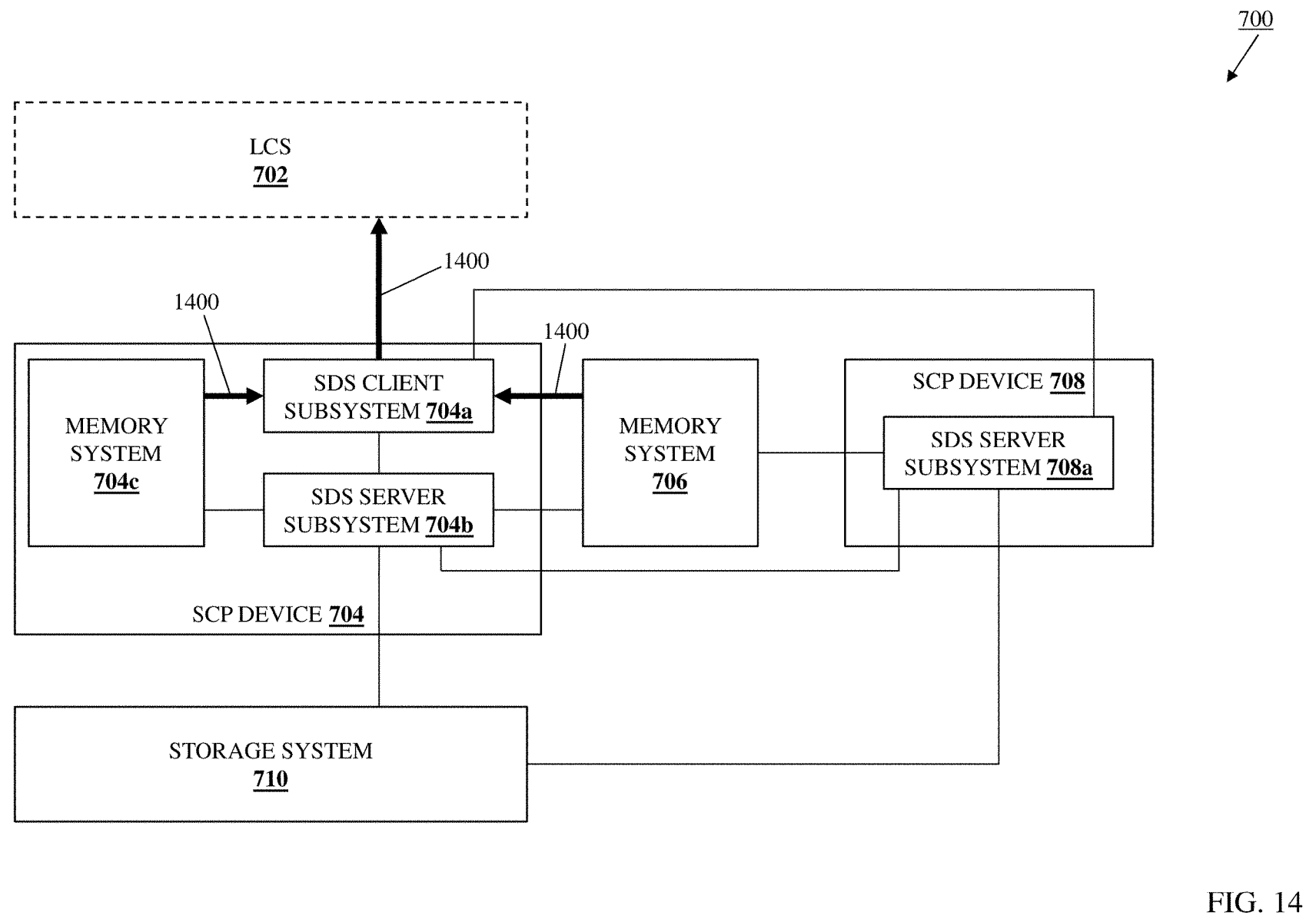

SCP DEVICE 708

SDS SERVER SUBSYSTEM 708a

MEMORY SYSTEM 706

1400

1400

LCS 702

SDS CLIENT SUBSYSTEM 704a

SDS SERVER SUBSYSTEM 704b

SCP DEVICE 704

1400

MEMORY SYSTEM 704c

STORAGE SYSTEM 710

SDS LOCAL DATA PATH OPTIMIZATION SYSTEM

BACKGROUND

The present disclosure relates generally to information handling systems, and more particularly to optimizing Software Defined Storage (SDS) provided for information handling systems using local data paths.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may be used to provide users with Logically Composed Systems (LCSs) that include logical systems that perform workloads using the components in one or more server devices, and data storage for LCSs is often enabled using Software-Defined Storage (SDS) systems. Conventional SDS systems are provided using Transmission Control Protocol/Internet Protocol (TCP/IP) in order to provide maximum flexibility and minimal dependency on hardware, and any particular SDS data path may, for example, transfer data via multiple "hops" between an application provided by the LCS and an SDS client provided for the LCS, the SDS client and an SDS server provided for the LCS, and the SDS server and a storage system. As will be appreciated by one of skill in the art, each of such hops involve data copies between Input/Output (IO) buffers and networking buffers that operate to amplify memory and networking bandwidth usage.

The inventors of the present disclosure have recognized that the disaggregated infrastructures used to provide LCSs introduce opportunities to optimize data paths used in the SDS system to avoid the TCP/IP overhead discussed above.

SUMMARY

According to one embodiment, an Information Handling System (IHS) includes a Software Defined Storage (SDS) processing system; and an SDS memory system that is coupled to the SDS processing system and that includes instructions that, when executed by the SDS processing system, cause the SDS processing system to provide an SDS server engine that is configured to: establish a first Transmission Control Protocol/Internet Protocol (TCP/IP) connection with an SDS client subsystem; determine that the SDS client subsystem and the SDS server engine share a data storage memory system; receive, via the first TCP/IP connection, a first data read request from the SDS client subsystem; determine the first data read request is associated with data stored in the data storage memory system; and provide, via the first TCP/IP connection, a first data read response that is configured to cause the SDS client subsystem to read the data from the data storage memory system.

BRIEF DESCRIPTION OF THE DRAWINGS

FIG. 12 is a schematic view illustrating an embodiment of the operation of the LCS provisioning system of FIG. 7 during the method of FIG. 8.

FIG. 14 is a schematic view illustrating an embodiment of the operation of the LCS provisioning system of FIG. 7 during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
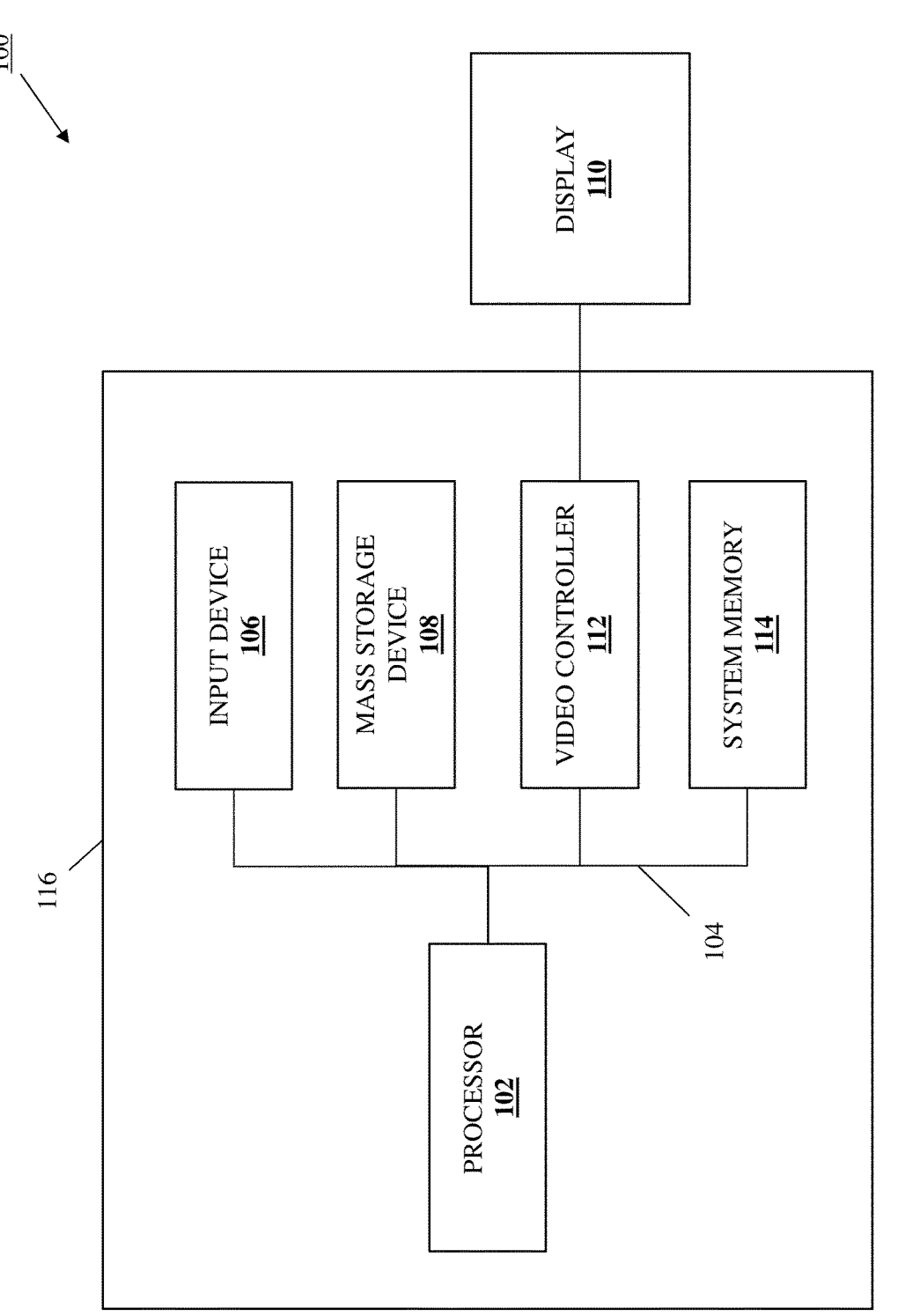
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the SDS local data path optimization systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
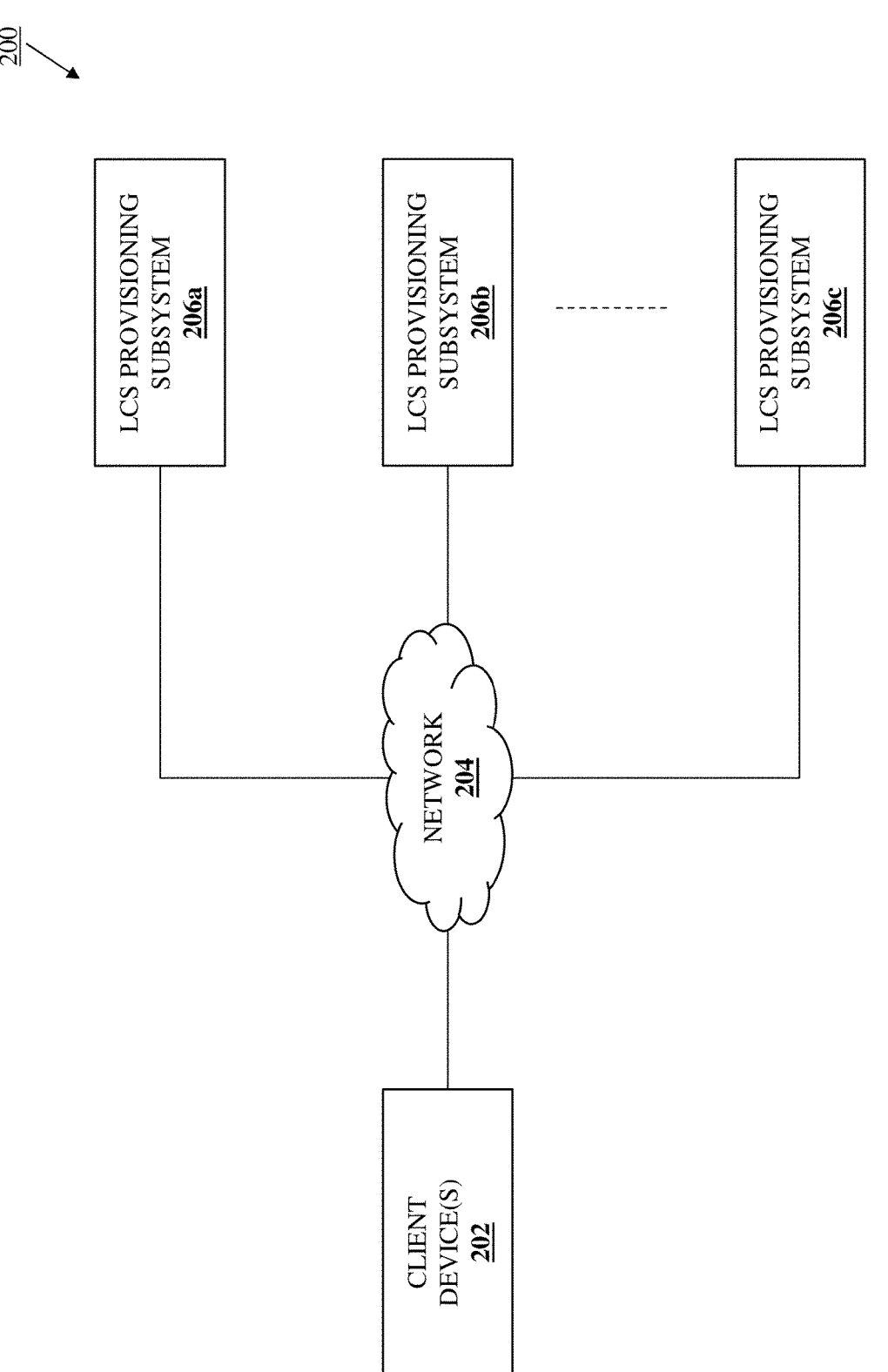
FIG. 2 is a schematic view illustrating an embodiment of an LCS provisioning system.

With reference to FIG. 2, an embodiment of a Logically Composed System (LCS) provisioning system 200 is illustrated that may be utilized with the SDS local data path optimization systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
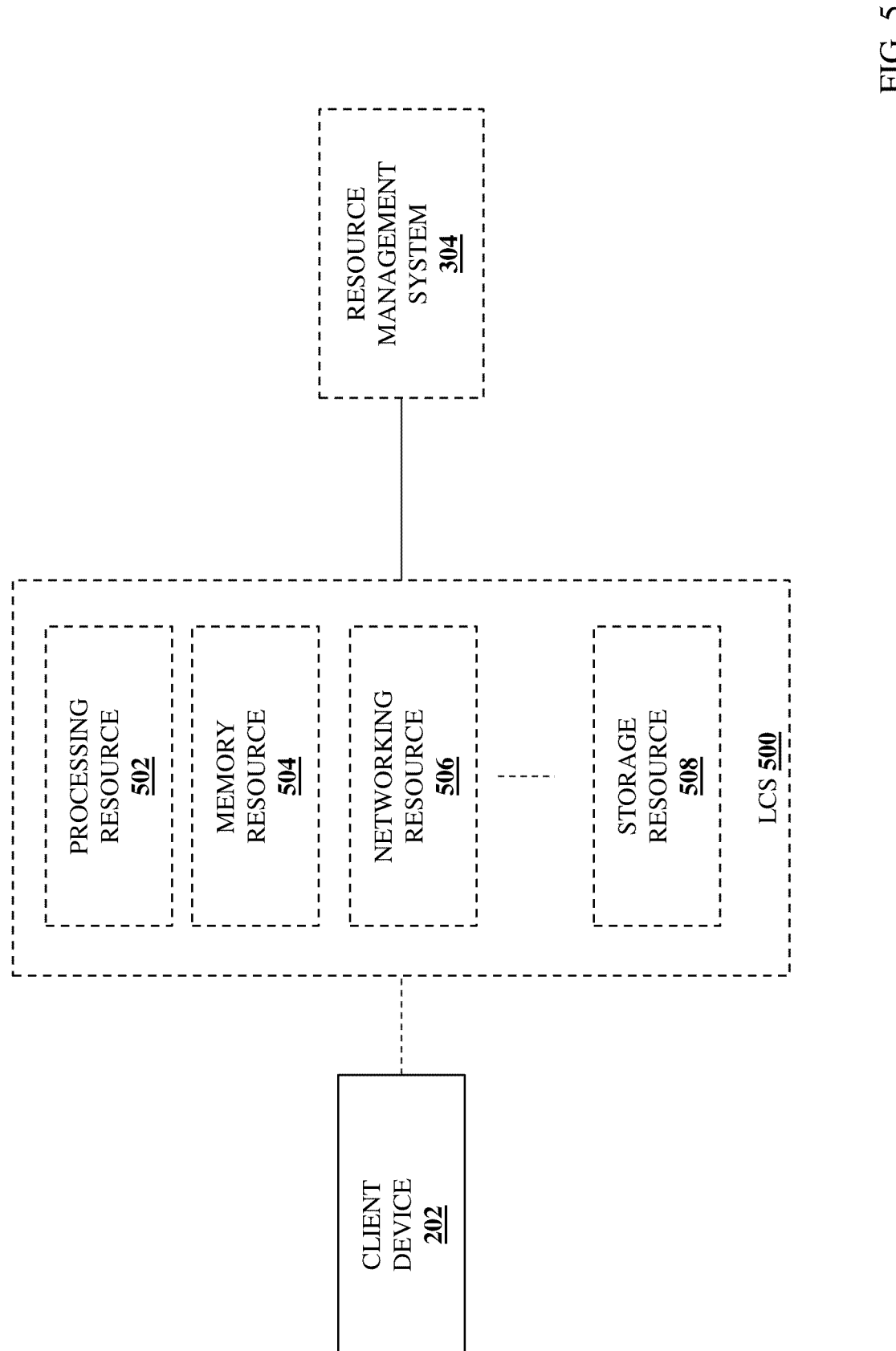
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protectedobject-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device (s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
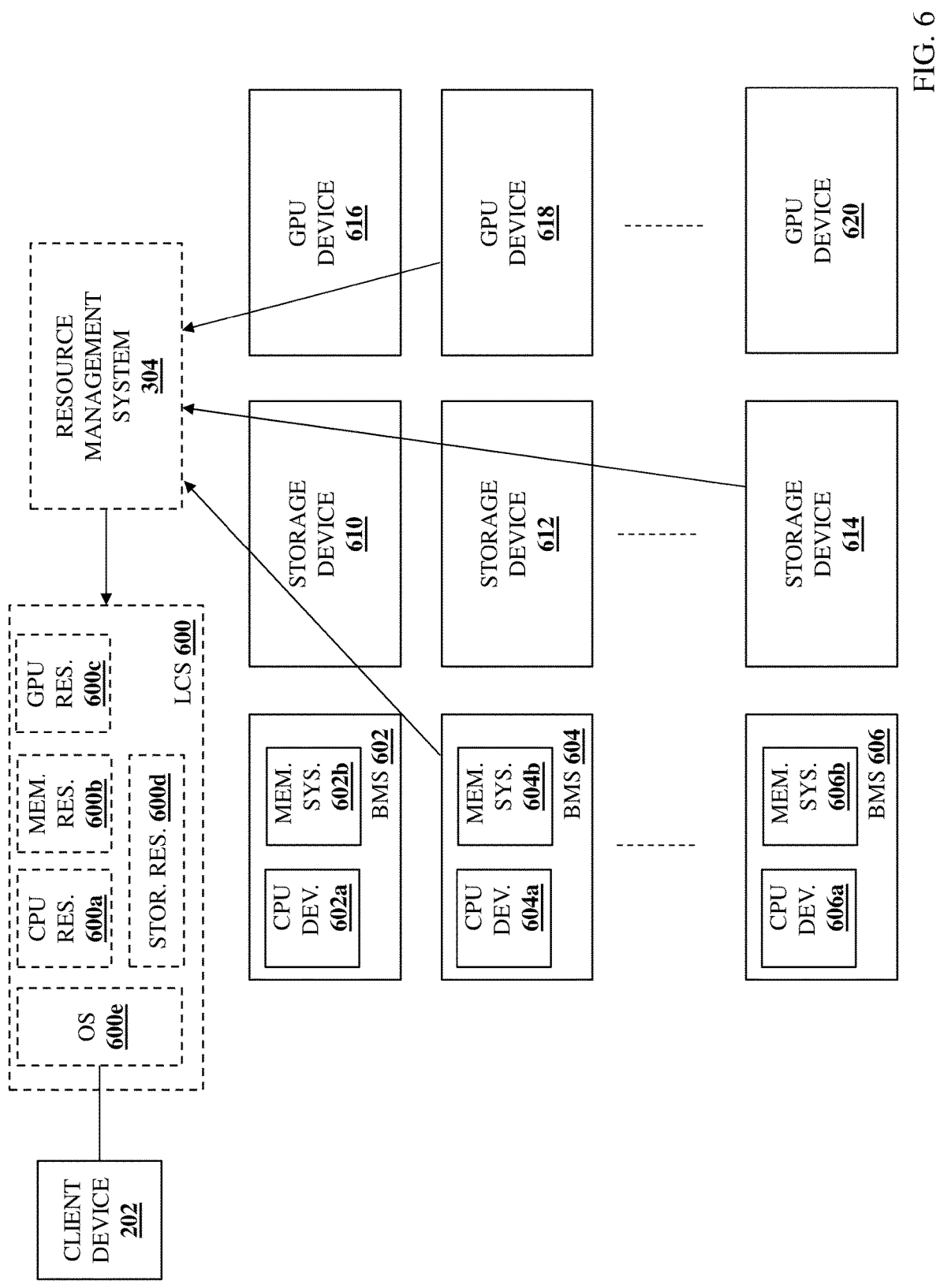
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614.

Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
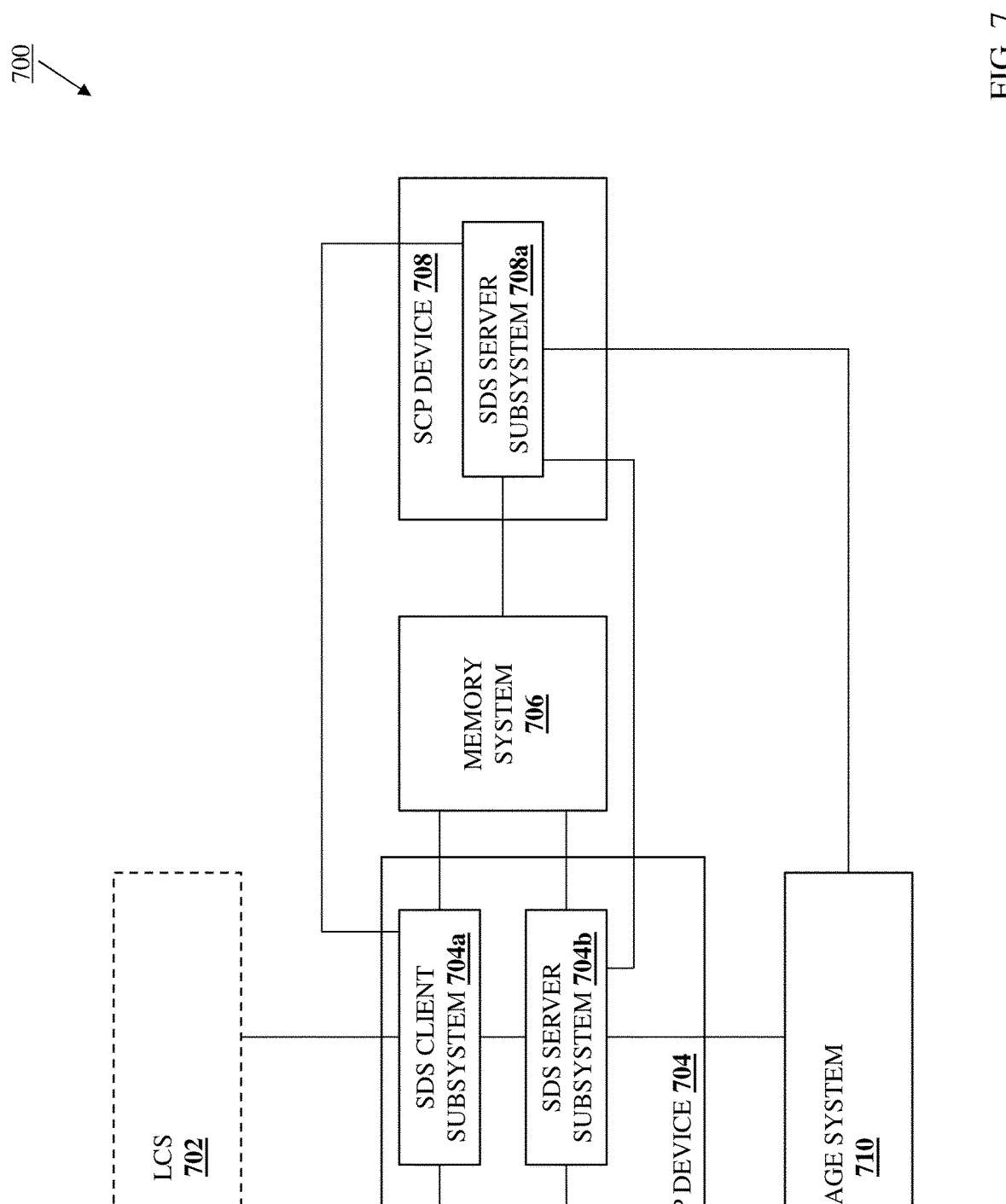
FIG. 7 is a schematic view illustrating an embodiment of an LCS provisioning system.

Referring now to FIG. 7, an embodiment of an LCS provisioning system 700 is illustrated that may utilize the SDS local data path optimization system of the present disclosure. However, while illustrated and described as being utilized in the LCS provisioning system of the present disclosure, one of skill in the art in possession of the present disclosure will appreciate how the SDS local data path optimization system of the present disclosure may be utilized with other SDS systems while remaining within the scope of the present disclosure as well.

In the illustrated embodiment, the LCS provisioning system 700 includes an LCS 702 that may be provided using any of the LCS provisioning techniques described above. As such, the LCS 702 may be provided using any of the resource systems 306*a*-306*c* discussed above with reference to FIG. 3, the resource system 400 and resource devices 404*a*-404*c* discussed above with reference to FIG. 4, the BMSs 602, 604, and up to 606 discussed above with reference to FIG. 6, and/or any other LCS components described above. As such, the LCS 702 is coupled to an SCP device 704 that may be used to provide the LCS 702 similarly as described above, and that SCP device 704 is illustrated and described below as providing storage for the LCS 702 via an SDS system. As such, a specific example of the LCS provisioning system 700 in FIG. 7 may include an unillustrated BMS and the SCP device 704 providing the LCS 702.

As illustrated, the SDS system utilized by the SCP device 704 to provide storage for the LCS 702 includes an SDS client subsystem 704*a* that may be provided by an SDS client memory system in the SCP device 704 that is coupled to an SDS client processing system and that includes instructions that, when executed by the SDS client processing system, cause the SDS client processing system to provide an SDS client engine that is configured to provide any of the functionality described below for the SDS client engines or SDS client subsystems 704*a* described below. Similarly, the SDS system utilized by the SCP device 704 to provide storage for the LCS 702 includes an SDS server subsystem 704*b* that may be provided by an SDS server memory system in the SCP device 704 that is coupled to an SDS server processing system and that includes instructions that, when executed by the SDS server processing system, cause the SDS server processing system to provide an SDS server engine that is configured to provide any of the functionality described below for the SDS server engines or SDS server subsystems 704*b* described below.

In the illustrated embodiment, a "data storage" memory system 704*c* is included in the SCP device 704 and coupled to each of the SDS client subsystem 704*a* and the SDS server subsystem 704*b*, and as described below may provide a "local" memory system in the SCP device 704 that is used by the SDS client subsystem 704*a* and the SDS server subsystem 704*b*. However, while the SDS client subsystem 704*a* and the SDS server subsystem 704*b* are illustrated as being provided by an SCP device 704, one of skill in the art in possession of the present disclosure will appreciate how the SCP device 704 may be replaced by a Data Processing Unit (DPU) device or other devices that provide the SDS client subsystem 704*a* and the SDS server subsystem 704*b* while remaining within the scope of the present disclosure as well.

In the illustrated embodiment, the LCS provisioning system 700 also includes a "data storage" memory system 706 that is illustrated as being coupled to the SCP device 704 via a network such as a Local Area Network (LAN), a Wide Area Network (WAN), the Internet, combinations thereof, and/or any other network that would be apparent to one of skill in the art in possession of the present disclosure. For example, the memory system 706 may be a Compute eXpress Link (CXL)-enabled memory system that may be connected to the SCP device 704 using any of a variety of CXL connection techniques that would be apparent to one of skill in the art in possession of the present disclosure. As such, the SDS client subsystem 704*a* and the SDS server subsystem 704*b* may be coupled to an "external"/network-connected memory system 706 as well as the "local" memory system 704*c*, although one of skill in the art in possession of the present disclosure will appreciate how the SDS client subsystem 704*a* and the SDS server subsystem 704*b* may be coupled to either the "local" memory system 704*c* or the "external"/network-connected memory system 706 while remaining within the scope of the present disclosure as well.

However, the memory system 706 described below may be provided in a variety of other configurations while remaining within the scope of the present disclosure as well. For example, the memory system 706 may be included in the BMS that provides the LCS 702, and thus may be coupled to the SCP device 704 using PCIe couplings and/or other couplings that would be apparent to one of skill in the art in possession of the present disclosure. In such an embodiment, the BMS that provides the LCS 702 may include an SDS server subsystem that is similar to the SDS subsystem 704*b* described above, and that may be coupled to the SDS client subsystem 704a (as well as SDS server subsystem 704b) to couple the SDS client subsystem 704a to the memory system 706.

For purposes of some of the examples provided below, the LCS provisioning system 700 also includes an SCP device 708 that includes an SDS server subsystem 708a that may be provided by an SDS server memory system in the SCP device 708 that is coupled to an SDS server processing system and that includes instructions that, when executed by the SDS server processing system, cause the SDS server processing system to provide an SDS server engine that is configured to provide any of the functionality described below for the SDS server engines or SDS server subsystems 708a described below. As illustrated, the SDS server subsystem 708a in the SCP device 708 may be coupled to each of the SDS client subsystem 704a and the SDS server subsystem 704b in the SCP device 704.

As described below, the SDS system utilized by the SCP device 704 to provide storage for the LCS 702 may include the SDS server subsystem 708a in the SCP device 708 that may operate as a "remote" SDS server subsystem for the LCS 702 that provides SDS functionality for the LCS 702 along with the "local" SDS server subsystem 704b in the SCP device 704, and one of skill in the art in possession of the present disclosure in the art in possession of the present disclosure will appreciate how additional "remote" SDS server subsystems that operate similarly to the SDS server subsystem 708a to provide storage for the LCS 702 may be provided in the LCS provisioning system 700 while remaining within the scope of the present disclosure as well. Thus, the SDS server subsystems 704b, 708a, and other SDS server subsystems may be coupled to each other to provide the SDS system of the present disclosure, with the SDS client subsystem 704a provided for the LCS 702 coupled to and configured to utilize any of those SDS server subsystems.

However, in some embodiments, the SCP device 708 may be replaced by a BMS that provides an LCS that may be similar to the LCS 702 discussed above. In such embodiments, that BMS may include the memory system 706 and the SDS server subsystem 708a that operate similarly as described below. As such, one of skill in the art in possession of the present disclosure will appreciate how the configuration of the LCS provisioning system 700 illustrated in FIG. 7 may be modified in a variety of manners that will fall within the scope of the present disclosure.

In the illustrated embodiment, the LCS provisioning system 700 includes a storage system 710 that is part of the SDS system utilized by the SCP device 704 to provide storage for the LCS 702, and that is coupled to the SDS server subsystem 704b in the SCP device 704 and to the SDS server subsystem 708a in the SCP device 708. For example, the storage system 710 may be provided by a "Bunch of Flash" (BOF) storage system that utilizes Non-Volatile Memory express (NVMe) storage devices such as a Just a Bunch Of Flash (JBOF) storage system, an Ethernet Bunch Of Flash (EBOF) storage system, and/or any other storage system that one of skill in the art in possession of the present disclosure would recognize as capable of being utilized with SDS systems. However, while a specific LCS provisioning system 700 has been illustrated and described, one of skill in the art in possession of the present disclosure will recognize that the SDS local data path optimization system of the present disclosure may include a variety of components and component configurations while remaining within the scope of the present disclosure as well.

As such, the SDS client subsystem 704a and the SDS server subsystem 704b may "share" a memory system as described below in a variety of manners, including sharing a memory system (e.g., a Dynamic Random Access Memory (DRAM) system) that allows them to exchange data via shared memory references as described below, or sharing a common memory address space that is provided by multiple memory systems interconnected via a fabric such as a PCIe fabric, a CXL fabric, and/or other fabrics that would be apparent to one of skill in the art in possession of the present disclosure. As will be appreciated by one of skill in the art in possession of the present disclosure, the sharing of the common memory address spaced as discussed above will allow the SDS client subsystem 704a and the SDS server subsystem 704b to establish the optimized data transfers discussed below via DMA/RDMA/SDXI primitives, and without the overhead associated with conventional data buffer copies among I/O stacks and networking stacks.

Figure 8:
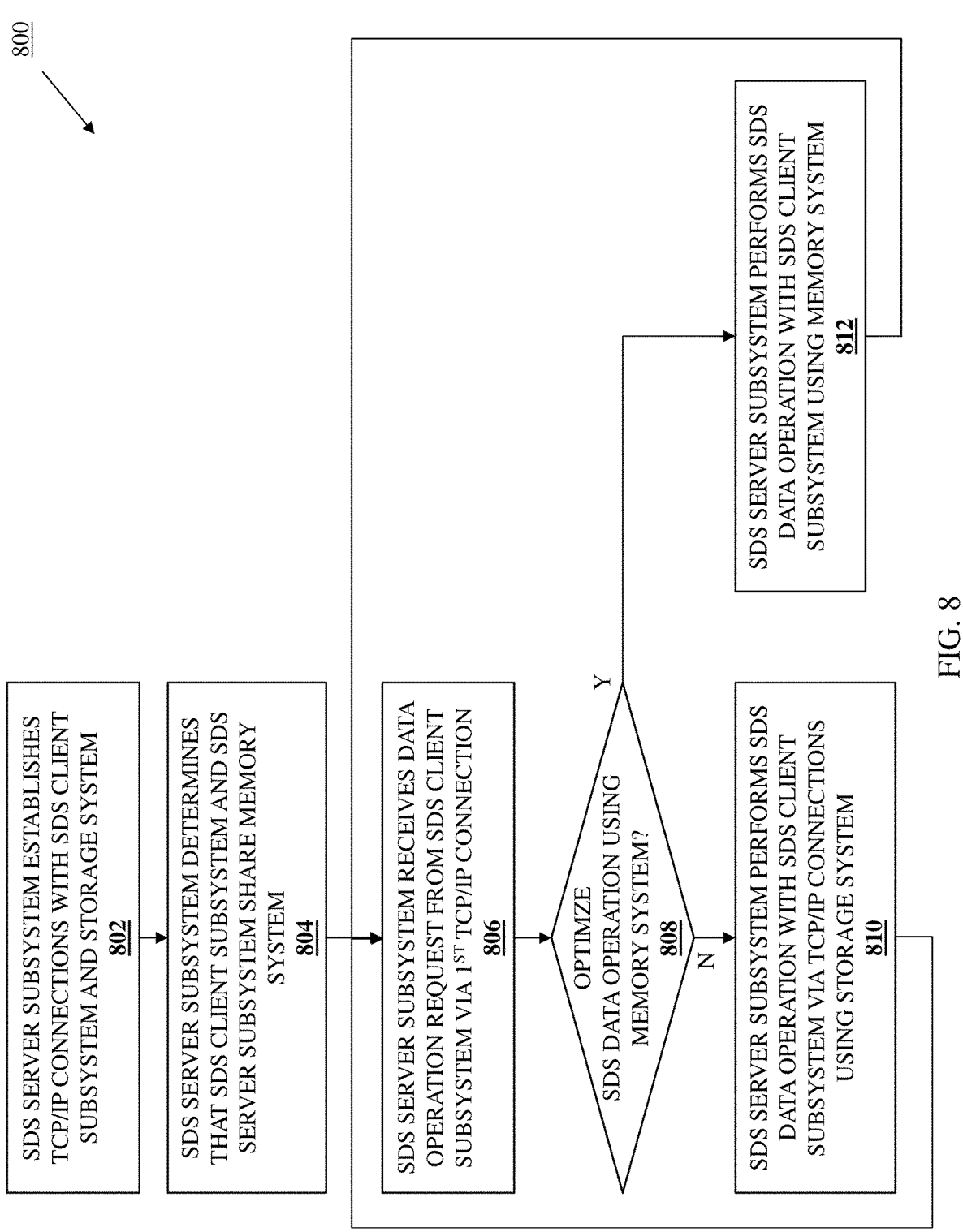
FIG. 8 is a flow chart illustrating an embodiment of a method for optimizing SDS using a local data path.

Referring now to FIG. 8, an embodiment of a method 800 for optimizing Software Defined Storage (SDS) via the use of a local data path is illustrated. As discussed below, the systems and methods of the present disclosure provide for the optimization of SDS functionality via the discovery and use of local data paths that eliminate the transmission of data via TCP/IP connections to provide data to an SDS client subsystem. For example, the SDS system of the present disclosure may include a memory system, an SDS client subsystem that is coupled to the memory system, and an SDS server subsystem that is coupled to the memory system. The SDS server subsystem determines that the SDS client subsystem and the SDS server subsystem share the memory system, and establishes a first Transmission Control Protocol/Internet Protocol (TCP/IP) connection with the SDS client subsystem. The SDS server subsystem then receives a first data read request via the first TCP/IP connection from the SDS client subsystem, determines the first data read request is associated with data stored in the memory system, and provides a first data read response via the first TCP/IP connection that is configured to cause the SDS client subsystem to read the data from the memory system. As such, hops in conventional SDS systems via TCP/IP connections that require data copies between IO buffers and networking buffers and that operate to amplify memory and networking bandwidth usage may be eliminated when alternative local data paths are available.

Figure 9:
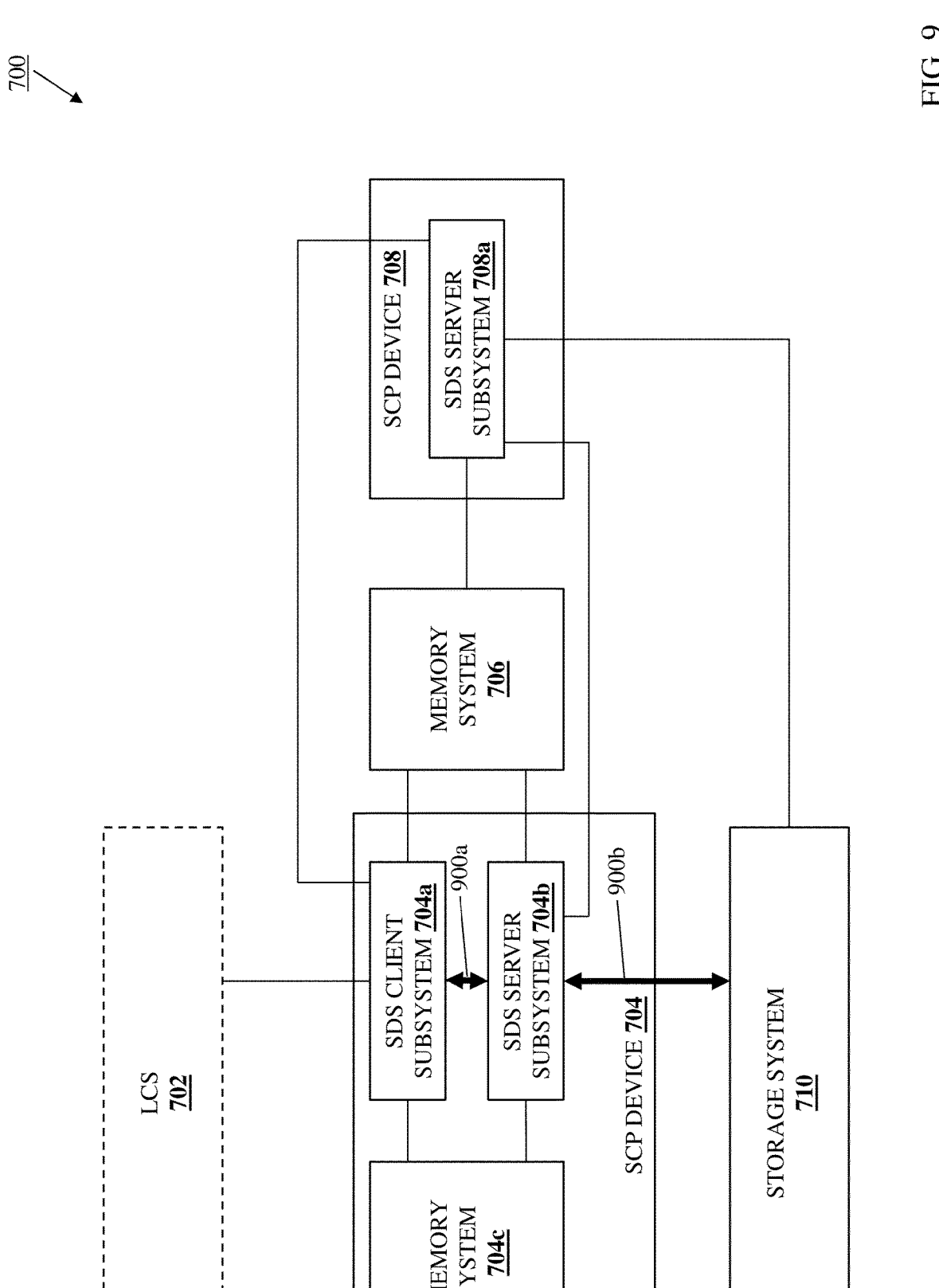
FIG. 9 is a schematic view illustrating an embodiment of the operation of the LCS provisioning system of FIG. 7 during the method of FIG. 8.

The method 800 begins at block 802 where the SDS server subsystem establishes TCP/IP connections with an SDS client subsystem and a storage system. With reference to FIG. 9, in an embodiment of block 802, the SDS server subsystem 704b in the SCP device 704 may perform TCP/IP connection establishment operations that include "first" TCP/IP connection establishment operations 900a that establish a TCP/IP connection with the SDS client subsystem 704a, and "second" TCP/IP connection establishment operations 900b that establish a TCP/IP connection with the storage system 710.

While not illustrated and described herein in detail, one of skill in the art in possession of the present disclosure will appreciate how the TCP/IP connection establishment operations with the SDS client subsystem 704 and the storage system 710 may be include an SDS client service provided by a Non-Volatile Memory express (NVMe) emulation controller in the SCP device 704 establishing an TCP/IP connection with an Ethernet switch device that is coupled to the storage system 710, an SDS server service provided by the SCP device 704 establishing an TCP/IP connection with the Ethernet switch device that is coupled to the storage system 710, an Open virtual Switch (Open vSwitch) provided by the SCP device 704 establishing an TCP/IP connection with the Ethernet switch device that is coupled to the storage system 710, as well as any of a variety of conventional TCP/IP connection establishment operations (e.g., obtaining TCP/IP addresses, establishing TCP/IP connection channels, etc.) known in the art. Furthermore, while not illustrated or described in detail, one of skill in the art in possession of the present disclosure will appreciate how the SDS server subsystem 708a in the SCP device 708 may establish TCP/IP connections with the storage system 710 in a similar manner while remaining within the scope of the present disclosure as well.

As will be appreciated by one of skill in the art in possession of the present disclosure, the TCP/IP networking protocol used to provide the TCP/IP connection discussed herein is the most prevalent networking protocol utilized with the Internet, and when software defined services such as the SDS services described herein provide advanced storage solutions via commodity hardware, the TCP/IP protocol will generally be used to connect and aggregate storage resources and services. As such, one of skill in the art in possession of the present disclosure will appreciate how the use of the TCP/IP protocol in the SDS system as described herein results in no need for purpose-built hardware to provide the data transmission optimizations discussed below.

The method 800 then proceeds to block 804 where an SDS server subsystem determines that the SDS client subsystem and the SDS server subsystem share a memory system. As will be appreciated by one of skill in the art in possession of the present disclosure, the SDS system of the present disclosure provides an abstraction that allows an SDS client subsystem and an SDS server subsystem to opportunistically optimize data transfers based on memory locality (i.e., the shared memory system(s) discussed above). When the SDS client subsystem 704a and the SDS server subsystem 704b of the present disclosure initially establish the TCP/IP connection at block 802, they may not have prior knowledge of whether such shared memory system(s) are available. As such, following the establishment of the TCP/IP connection at block 802, the SDS client subsystem 704a and the SDS server subsystem 704b may discover their shared memory based on a context of the TCP/IP connection (e.g., based on whether an operating system provided by the LCS 702 uses a loopback network interface for that TCP/IP connection, whether they can establish an RDMA connection over IP, or via the validation operations described below).

In an embodiment, at block 804 and during the TCP/IP connection establishment operations discussed above, the SDS server subsystem 704b in the SCP device 704 may perform shared memory system determination operations to determine whether the SDS server subsystem 704b shares a memory system with the SDS client subsystem 704a. In an embodiment, at block 804, the SDS server subsystem 704b may operate to obtain an IP address for the SDS server subsystem 704b, and then use that IP address to discover whether the SDS server subsystem 704b are provided by the same "host", or share a Peripheral Component Interconnect express (PCIe) memory address space that may be available via the Open vSwitch described above.

For example, at block 804 the shared memory system determination operations may include determining whether the SDS server subsystem 704b shares the memory system 704c with the SDS client subsystem 704a by determining whether the SDS server subsystem 704b and the SDS client subsystem 704a are provided by the same "host" (e.g., whether the SDS server subsystem 704b and the SDS client subsystem 704a are both provided by the same processing system in the SCP device 704, whether the SDS server subsystem 704b is provided by a first processing system on a BMS and the SDS client subsystem 704a is provided by a second processing system in the SCP device 704 that is included in or directly connected to that BMS, etc.).

In another example, at block 804 the shared memory system determination operations may include determining whether the SDS server subsystem 704b shares the memory system 706 with the SDS client subsystem 704a by determining whether the SDS server subsystem 704b and the SDS client subsystem 704a share the same memory address space (e.g., using any of variety of Smart Data Acceleration Interface (SDXI) discovery operations that one of skill in the art in possession of the present disclosure would recognize as identifying SDXIs connecting the SDS server subsystem 704b and the SDS client subsystem 704a to a Compute eXpress Link (CXL)-enabled memory system that provides the memory system 706). As will be appreciated by one of skill in the art in possession of the present disclosure, SDS server subsystem/SDS client subsystem communications are proprietary, and thus their co-location may be identified in a variety of ways, including having the SCPM subsystem discussed above inform the SDS server subsystem 704b of such, having a user provide the SDS server subsystem 704b with such information, having the SDS server subsystem 704b and the SDS client subsystem 704a share such information, having the SDS server subsystem 704b determine such information via the use of a data path that is available to communicate with the SDS client subsystem 704a, and/or via a variety of other techniques that would be apparent to one of skill in the art in possession of the present disclosure.

In an embodiment, the determination that the SDS client subsystem and the SDS server subsystem share a memory system at block 804 may include validation operations to validate the use of that shared memory system for the SDS local data path optimization functionality described below. For example, the validation operations at block 804 may be performed using "challenge/response" techniques that include the SDS client subsystem 704a generating challenge information and storing that challenge information in a challenge information memory location in the shared memory system (e.g., in the memory system 704c and/or the memory system 706). The SDS client subsystem 704a may then send the challenge information memory location to the SDS server subsystem 704b, and the SDS server subsystem 704b may read the challenge information in that challenge information memory location (e.g., via Direct Memory Access (DMA) operations, Remote Direct Memory Access (RDMA) operations, SDXI operations, etc.) and provide a challenge information response in the challenge information memory location in the shared memory system. The SDS client subsystem 704a may then read the challenge information response from the challenge information memory location in the shared memory system in order to validate that challenge information response.

As will be appreciated by one of skill in the art in possession of the present disclosure, the challenge/response techniques performed via the shared memory system may operate to both to authenticate subsequent communications between the SDS client subsystem 704a and the SDS server subsystem 704b, as well as to perform a "test" data transfer that confirms that the SDS client subsystem 704a and the SDS server subsystem 704b share a memory system (e.g., to confirm they are provided by the same "host" or share the same memory space as described above). In response to validating the shared memory system between the SDS client subsystem 704a and the SDS server subsystem 704b, the SDS server subsystem 704b may enable the local data path SDS optimization functionality of the present disclosure that will utilize that shared memory system for data transfers to the SDS client subsystem 704a when available.

The method 800 then proceeds to block 806 where the SDS server subsystem receives a data operation request from the SDS client subsystem via the first TCP/IP connection. As will be appreciated by one of skill in the art in possession of the present disclosure, the LCS 702 may request data operations from the SDS client subsystem 704a that will cause the SDS client subsystem 704a to generate and transmit data operation requests to the SDS server subsystem 704b via the TCP/IP connection that was established between the SDS client subsystem 704a and the SDS server subsystem 704b at block 802. For example, the LCS 702 may request data write operations from the SDS client subsystem 704a that will cause the SDS client subsystem 704a to generate and transmit data write requests to the SDS server subsystem 704b via the TCP/IP connection that was established between the SDS client subsystem 704a and the SDS server subsystem 704b at block 802, or the LCS 702 may request data read operations from the SDS client subsystem 704a that will cause the SDS client subsystem 704a to generate and transmit data read requests to the SDS server subsystem 704b via the TCP/IP connection that was established between the SDS client subsystem 704a and the SDS server subsystem 704b at block 802, although other data operations will fall within the scope of the present disclosure as well.

Figure 10:
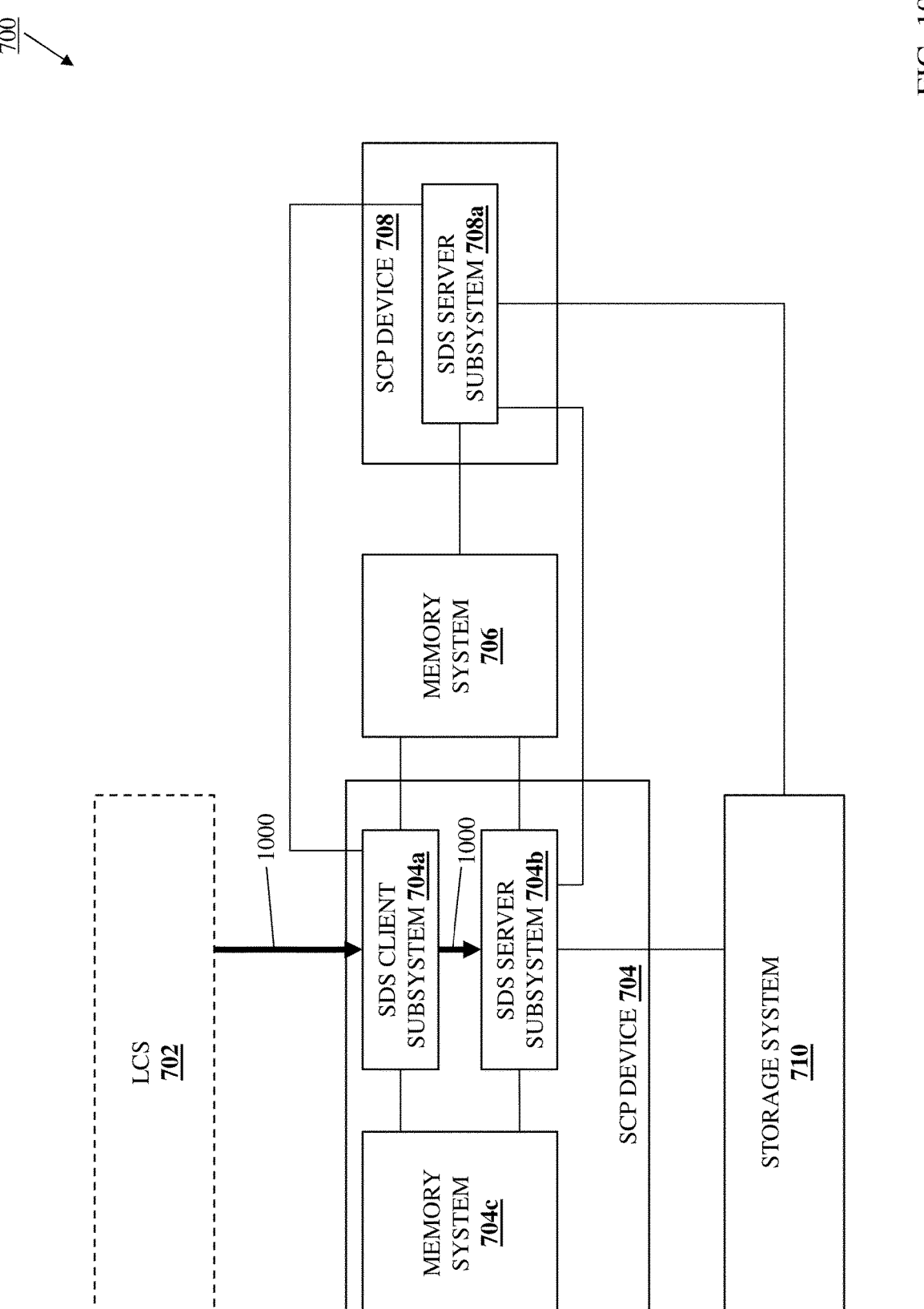
FIG. 10 is a schematic view illustrating an embodiment of the operation of the LCS provisioning system of FIG. 7 during the method of FIG. 8.

As such, with reference to FIG. 10 and in an embodiment of block 806, the LCS 702 and the SDS client subsystem 704a may perform data operation request operations 1000 that include the LCS 702 requesting data operations from the SDS client subsystem 704a to cause the SDS client subsystem 704a to generate and transmit a data operation request via the TCP/IP connection to the SDS server subsystem 704b. In this specific example of a first iteration of the method 800, the data operation request operations 1000 include the LCS 702 requesting a data read from the SDS client subsystem 704a to cause the SDS client subsystem 704a to generate and transmit a data read request via the TCP/IP connection to the SDS server subsystem 704b.

The method 800 then proceeds to decision block 808 where the method 800 proceeds depending on whether an SDS data operation can be optimized using the memory system. In an embodiment, at decision block 808 and in response to receiving the data operation request at block 806, the SDS server subsystem 704b may perform SDS data operation optimization determination operations that include determining whether an SDS data operation requested in the data operation request received at block 806 can be optimized. As discussed in further detail below, some SDS data operations may be optimized using a "local data path" available via a memory system shared between the SDS client subsystem 704a and the SDS server subsystem 704b, and one of skill in the art in possession of the present disclosure will recognize how the SDS server subsystem 704b may determine whether such optimization may be performed depending on the type of SDS data operation that was requested, where the data associated with that SDS data operation is currently available via that local data path, and/or other factors that would be apparent to one of skill in the art in possession of the present disclosure. Continuing the specific example of the first iteration of the method 800 in which the SDS client subsystem 704a provided a data read request at block 806, the SDS server subsystem 704b may determine that the data read that provides the SDS data operation may be optimized if the data associated with that data read is currently stored in the memory systems 704c or 706 that are shared between the SDS client subsystem 704a and the SDS server subsystem 704b.

If, at decision block 808, the SDS data operation cannot be optimized using the memory system, the method 800 proceeds to block 810 where the SDS server subsystem performs the SDS data operation with the SDS client subsystem via a second TCP/IP connection using a storage system. In an embodiment, at block 810 and in response to determining that the SDS data operation cannot be optimized using the memory systems 704c or 706 that are shared between the SDS client subsystem 704a and the SDS server subsystem 704b, the SDS server subsystem 704b may perform the SDS data operation with the SDS client system via a second TCP/IP connection using the storage system 710.

Figure 11:
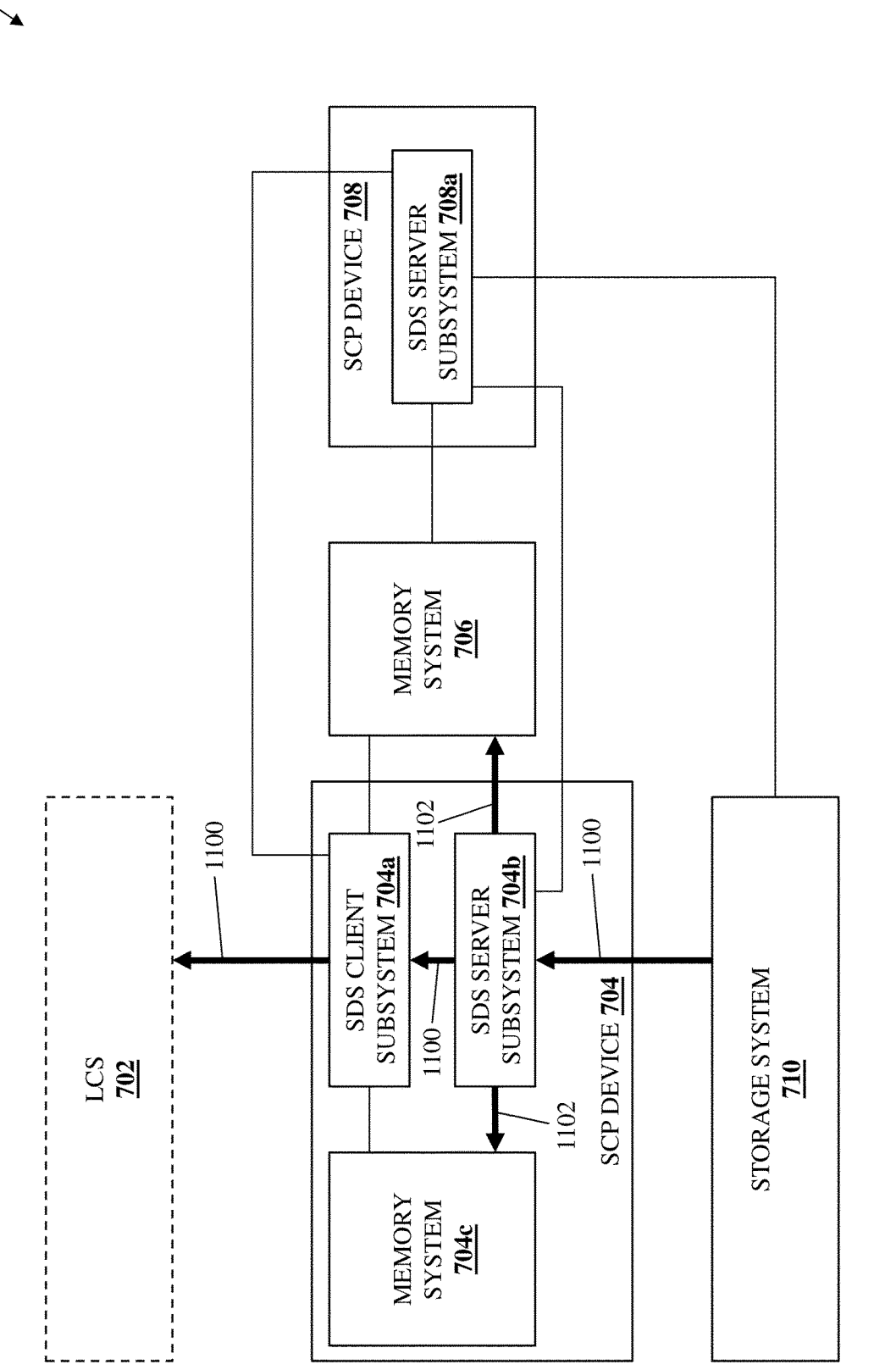
FIG. 11 is a schematic view illustrating an embodiment of the operation of the LCS provisioning system of FIG. 7 during the method of FIG. 8.

Continuing the specific example of the first iteration of the method 800 above in which the SDS client subsystem 704a provided a data read request at block 806, at decision block 808 the SDS server subsystem 704b may determine that the data associated with that data read request is stored in the storage system 710 and not in either of the memory systems 704c and 706. With reference to FIG. 11, at block 810 and in response to determining that the data associated with that data read request is stored in the storage system 710 and not in either of the memory systems 704c and 706, the SDS server subsystem 704b may perform data read operations 1100 that may include retrieving the data associated with the data read request via the second TCP/IP connection that was established with the storage system 710 at block 802, and providing that data via the first TCP/IP connection that was established with the SDS client subsystem 704a at block 802 such that the SDS client subsystem 704a provides that data to the LCS 702.

As will be appreciated by one of skill in the art in possession of the present disclosure, the provisioning of the data via the TCP/IP connections from the storage system 710 to the LCS 702 at block 810 may include a variety of conventional TCP/IP connection data provisioning operations known in the art. For example, such conventional TCP/IP connection data provisioning operations may require that the SDS server subsystem 704b retrieve the data via the second TCP/IP connection that was established with the storage system 710 at block 802, generate an IO buffer reference for an IO buffer in an SDS server IO software stack, allocate a network buffer in an SDS server network software stack based on a size of the IO buffer in the SDS server IO software stack, serialize the data to copy it from the IO buffer in the SDS server IO software stack to the network buffer in the SDS server network software stack, and then send the data from the network buffer in the SDS server network software stack to the SDS client subsystem 704a via the first TCP/IP connection that was established with the SDS client subsystem 704a at block 802. Furthermore, the provisioning of the data via the TCP/IP connections at block 810 may also require the SDS client subsystem 704a to receive the data from the SDS server subsystem 704b at a network buffer in an SDS client network software stack, allocate an IO buffer in an SDS client IO software stack, deserialize the data to copy it from the network buffer in the SDS client network software stack to the IO buffer in the SDS client IO software stack, and provide that data to the LCS 702.

As such, conventional operation of the SDS client subsystem 704*a* operates to provide virtualized storage access to the LCS 702 (i.e., applications running on the LCS), typically in the form of emulated local disk drives, with the SDS client subsystem 704*a* retrieving data from the IO buffer discussed above, copying that data to the network buffer discussed above, and forwarding that data to the SDS server subsystem 704*b* via TCP/IP connection(s). The conventional operation of the SDS server subsystem 704*b* operates to provide virtualized data storage and advanced data services such as distributed data access, data protection, and/or other data services that would be apparent to one of skill in the art in possession of the present disclosure, with the SDS server subsystem 7024*b* receiving data form the SDS client subsystem 704*a* via a network stack in the network buffer discussed above, processing that data, and eventually persisting that data on backend disk drives via an I/O stack in the SDS server subsystem 704*b*. Furthermore, one of skill in the art in possession of the present disclosure will appreciate how such backend storage may be provided by locally-attached disk drives, an Ethernet Bunch of Flash (eBOF) system, and/or other backend storage systems known in the art, with eBOF storage systems (and other similar storage systems) requiring one or more data copies from the I/O stack in the SDS server subsystem 704*b* to a network stack.

As illustrated in FIG. 11, at block 810 and in the case of data read operations, the SDS server subsystem 704*b* may also perform data caching operations 1102 that include storing the data that was retrieved as part of the data read request discussed above in the memory system 704*c* and/or the memory system 706. As will be appreciated by one of skill in the art in possession of the present disclosure, when data is retrieved from the storage system 710 as discussed above, that data may be "cached" or otherwise stored in the memory system 704*c* and/or 706 that is shared by the SDS client subsystem 704*a* and the SDS server subsystem 704*b* in order to enable the SDS local data path optimization functionality described below. However, while the "local" SDS server subsystem 704*b* is illustrated and described as caching data in the memory system 704*c* and/or the memory system 706, one of skill in the art in possession of the present disclosure will appreciate how data may be cached in the memory system shared between the SDS client subsystem 704*a* and the SDS server system 704*b* in other manners that will fall within the scope of the present disclosure as well.

For example, FIG. 12 illustrates how the "remote" SDS server subsystem 708*a* in the SCP device 708 may perform data retrieval/storage operations 1200 that include retrieving data from the storage system 710 via TCP/IP connections similarly as described above, and storing that data in the memory system 706 that is shared by the SDS client subsystem 704*a* and the SDS server subsystem 704*b*. While not illustrated or described in detail, one of skill in the art in possession of the present disclosure will appreciate how the "remote" SDS server subsystem 708*a* may retrieved the data from the storage system 710 in order to provide it to the LCS 702 similarly as described above, in order to provide it to another LCS, and/or for a variety of other data retrieval purposes that would be apparent to one of skill in the art in possession of the present disclosure. As such, data may be cached in the memory system 706 shared by the SDS client subsystem 704*a* and the SDS server subsystem 704*b* in a variety of manners that will fall within the scope of the present disclosure.

The method 800 then returns to block 806. As such, the method 800 may loop such that, when the SDS server subsystem 704*b* receives data operation requests from the SDS client subsystem 704*b* and the associated SDS data operations cannot be optimized using the memory system 704*c* and/or 706, the SDS server subsystem may perform the SDS data operation with the SDS client subsystem via TCP/IP connections and using the storage system 710.

If, at decision block 806, the SDS data operation can be optimized using the memory system, the method 800 proceeds to block 812 where the SDS server subsystem performs the SDS data operation with the SDS client subsystem using the memory system. Continuing the specific example above in which the first iteration of the method 800 resulted in data requested in a data read request being retrieved and provided to the SDS client subsystem 704*a* via TCP/IP connections, as well as stored in the memory systems 704*c* and/or 706, a second iteration of the method 800 may include the SDS server subsystem 704*b* receiving a data read request from the SDS client subsystem 704*a* at block 806 that is directed to that same data. As such, in this specific example of the second iteration of the method 800, the SDS server subsystem 704*b* may determine that the data associated with that data read request is stored in the memory system 704*c* and/or the memory system 706, and thus that SDS data operation (i.e., the data read) can be optimized at decision block 808.

Figure 13:
FIG. 13 is a schematic view illustrating an embodiment of the operation of the LCS provisioning system of FIG. 7 during the method of FIG. 8.

With reference to FIG. 13, at block 812 and in response to determining that the data is stored in the memory system 704*c* and/or the memory system 706, the SDS server subsystem 704*b* may perform data read instruction operations 1300 that may include generating a data read instruction directed to the data that is stored in the memory system 704*c* and/or the memory system 706 (e.g., with that data read instruction including memory address(es) in that memory system in which that data is stored), and providing that data read instruction via the first TCP/IP connection that was established with the SDS client subsystem 704*a* at block 802. With reference to FIG. 14, in response to receiving the data read instruction, the SDS client subsystem 704*a* may perform data provisioning operations 1400 that include retrieving the data identified in the data read instruction from the memory system 704*c* and/or the memory system 706 (e.g., retrieving that data from the memory address(es) in that memory system that were provided in the data read instruction), and providing that data to the LCS 702.

As will be appreciated by one of skill in the art in possession of the present disclosure, the data read instruction operations 1300 performed by the SDS server subsystem 704*b* may include the SDS server subsystem 704*b* allocating an IO buffer in the memory system 704*c* and/or the memory system 704*c* that stores the data associated with the data read request prior to providing the data read instruction to the SDS client subsystem 704*a*, with the SDS client subsystem 704*a* then performing a Direct Memory Access (DMA) operation to retrieve the data from the memory system 704*c*, performing an SDXI operation to retrieve the data from the memory system 706, performing an RDMA operation to retrieve that data from the memory system 704*c* or the memory system 706, and/or performing some other hardware-accelerated memory data retrieval operation with the memory system 704*c* and/or 706, followed by the SDS client subsystem 704*a* instructing the SDS server subsystem 704*b* to release any memory hold IO data subsequent to the provisioning of the data to the LCS 702.

As will be appreciated by one of skill in the art in possession of the present disclosure, the specific example of the data read instruction operations 1300 discussed above is just one possible scenario in which the optimized data transfers of the present disclosure are enabled via DMA/ SDXI/RDMA operations when the SDS server subsystem 704*b* includes a data cache, which as described above allows the SDS server subsystem 704*b* to instruct the SDS client subsystem 704*a* to perform the DMA/SDXI/RDMA operations to retrieve data from that data cache. However, one of skill in the art in possession of the present disclosure will appreciate how the SDS client subsystem 704*a* may also allocate memory (e.g., a DMA-enabled memory buffer) to hold data to-be read, and provide a memory reference to that memory to the SDS server subsystem 704*b* along with the data read request, allowing the SDS server subsystem 704*b* to perform DMA/RDMA operations to provide data directly in that memory. As such, one of skill in the art in possession of the present disclosure will appreciate how the data read instruction operations of the present disclosure may be performed in a variety of manners that will fall within the scope of the present disclosure.

The method 800 then returns to block 806. As such, the method 800 may loop such that, when the SDS server subsystem 704*b* receives data operation requests from the SDS client subsystem 704*b* and the associated SDS data operations can be optimized using the memory system 704*c* and/or 706, the SDS server subsystem may perform the SDS data operation with the SDS client subsystem using the memory system 704*c* and/or 706.

Figure 15:
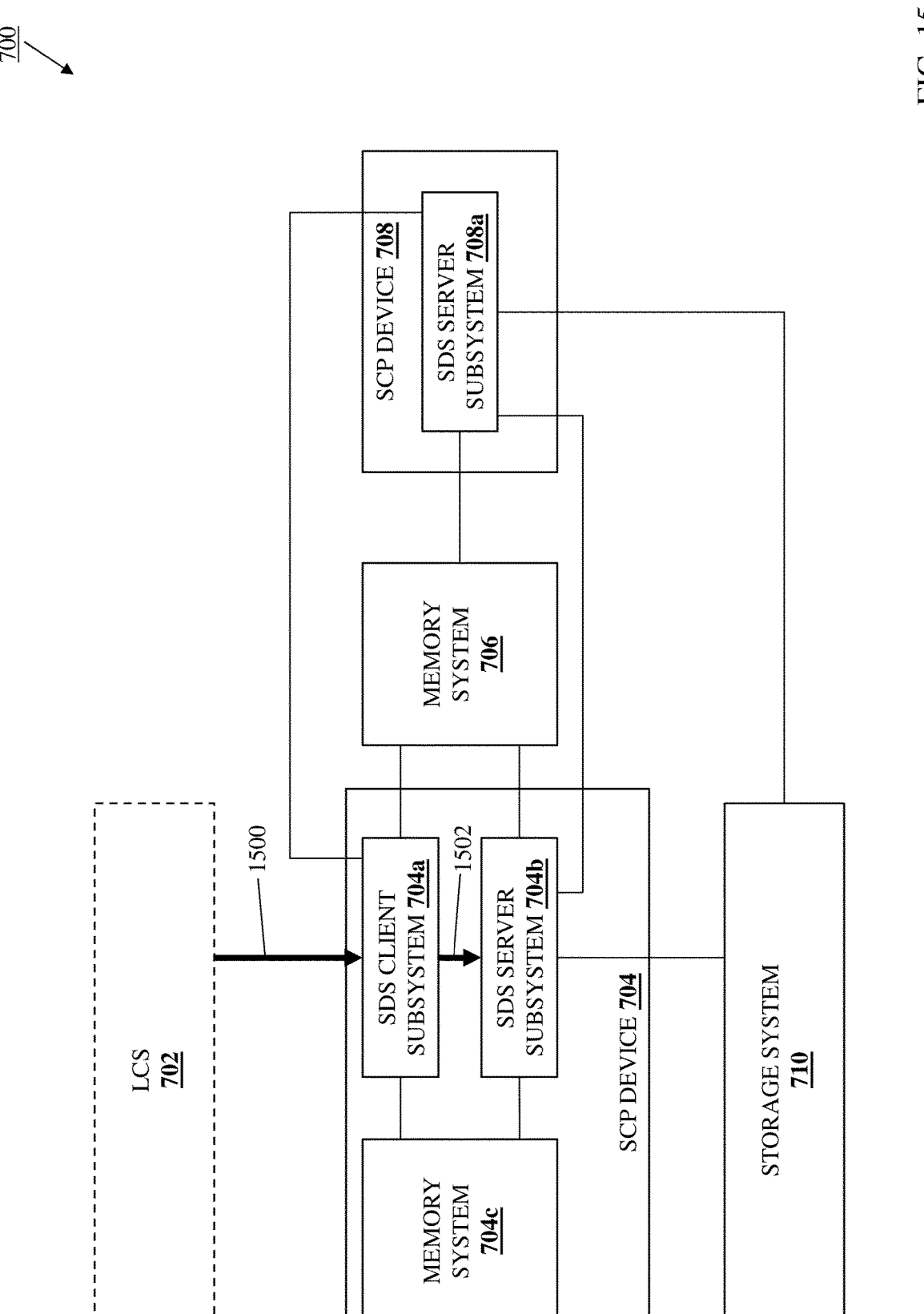
FIG. 15 is a schematic view illustrating an embodiment of the operation of the LCS provisioning system of FIG. 7 during the method of FIG. 8.

With reference to FIG. 15, in different specific example of the method 800, at block 806 the LCS 702 may perform data write operation request operations 1500 that include transmitting a data write operation request to the SDS client subsystem 704*a*, and SDS client subsystem 704*a* may perform data write request operations 1502 that include providing a data write request to the SDS server device 704*b* that requests a data write. At decision block 808, the SDS server subsystem 704*b* may then determine whether the data write that provides the SDS data operation may be optimized if the data associated with that data write must be immediately stored in the storage system 710.

Figure 16:
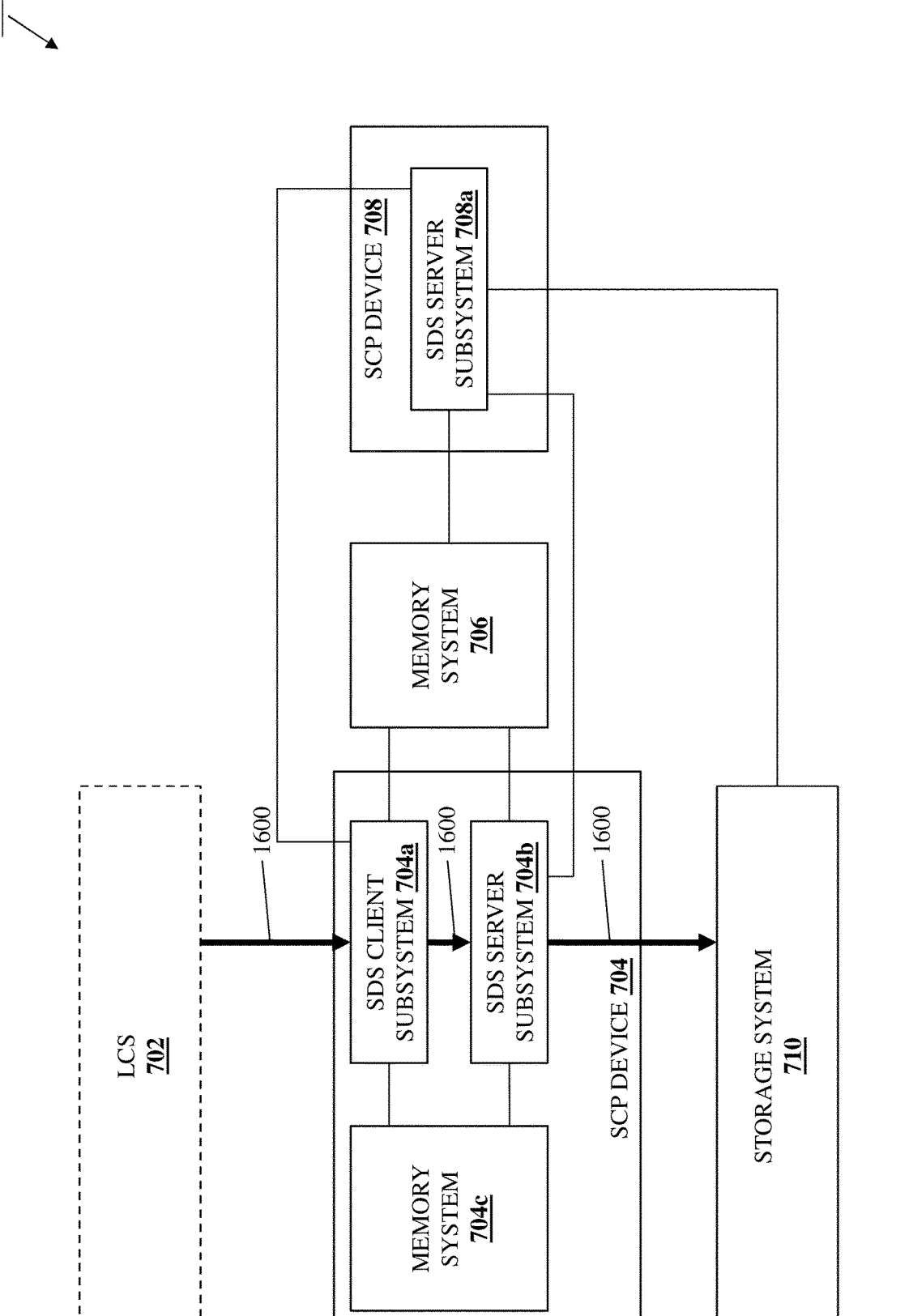
FIG. 16 is a schematic view illustrating an embodiment of the operation of the LCS provisioning system of FIG. 7 during the method of FIG. 8.

In the event the data associated with that data write must be immediately stored in the storage system 710, the method 800 may proceed to block 810. With reference to FIG. 16, the SDS server subsystem 704*b* may perform data write operations 1600 that may include retrieving the data associated with the data write request via the first TCP/IP connection that was established with the SDS client subsystem 704*a* at block 802 (with the SDS client subsystem 704*a* having retrieved that data from the LCS 702), and providing that data via the second TCP/IP connection that was established with the storage system 710 at block 802 to the storage system 710.

As will be appreciated by one of skill in the art in possession of the present disclosure, the provisioning of the data via the TCP/IP connections from the LCS 702 to the storage system 710 at block 810 may include a variety of conventional TCP/IP connection data provisioning operations known in the art. For example, such conventional TCP/IP connection data provisioning operations may require that the SDS client subsystem 704*a* retrieve the data from the LCS 702, generate an IO buffer reference for an IO buffer in an SDS client IO software stack, allocate a network buffer in an SDS client network software stack based on a size of the IO buffer in the SDS client IO software stack, serialize the data to copy it from the IO buffer in the SDS client IO software stack to the network buffer in the SDS client network software stack, and then send the data from the network buffer in the SDS client network software stack to the SDS server subsystem 704*b* via the first TCP/IP connection that was established with the SDS server subsystem 704*b* at block 802. Furthermore, the provisioning of the data via the TCP/IP connections at block 810 may also require the SDS server subsystem 704*b* to receive the data from the SDS client subsystem 704*a* at a network buffer in an SDS server network software stack, allocate an IO buffer in an SDS server IO software stack, deserialize the data to copy it from the network buffer in the SDS server network software stack to the IO buffer in the SDS server IO software stack, and provide that data to the storage system 710

Figure 17:
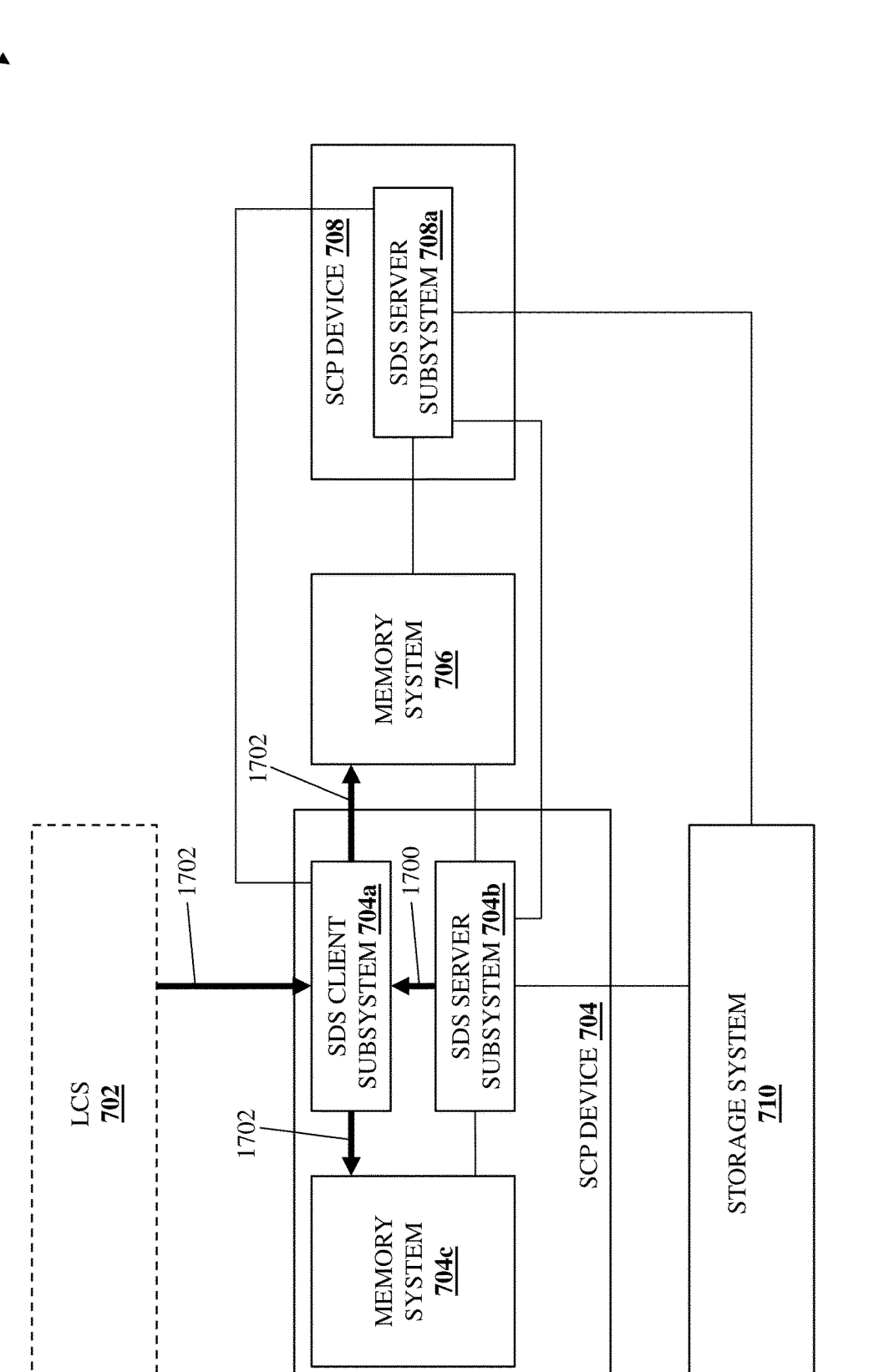
FIG. 17 is a schematic view illustrating an embodiment of the operation of the LCS provisioning system of FIG. 7 during the method of FIG. 8.

In the event the data associated with that data write need not be immediately stored in the storage system 710, the method 800 may proceed to block 812. With reference to FIG. 17, the SDS server subsystem 704*b* may perform data write response operations 1700 that include transmitting a data write response to the SDS client subsystem 704*a* via the first TCP/IP connection that was established with the SDS client subsystem 704*a* at block 802, with that data write response instructing the SDS client subsystem 704*a* to write the data associated with the data write request to the memory system 704*c* and/or the memory system 706 (e.g., with that data write response including memory address(es) in that memory system at which that data should be stored), and providing that data read instruction via the first TCP/IP connection that was established with the SDS client subsystem 704*a* at block 802.

In response to receiving the data write response, the SDS client subsystem 704*a* may perform data storage operations 1702 that include retrieving the data associated with the data write request from the LCS 702, and providing that data in the memory system 704*c* and/or the memory system 706 by performing a Direct Memory Access (DMA) operation to write the data to the memory system 704*c*, performing an SDXI operation to write the data to the memory system 706, performing an RDMA operation to write that data to the memory system 704*c* or the memory system 706, and/or performing some other hardware-accelerated memory data write operation with the memory system 704*c* and/or 706 (e.g., writing that data from the memory address(es) in that memory system that were provided in the data read instruction).

Figure 18:
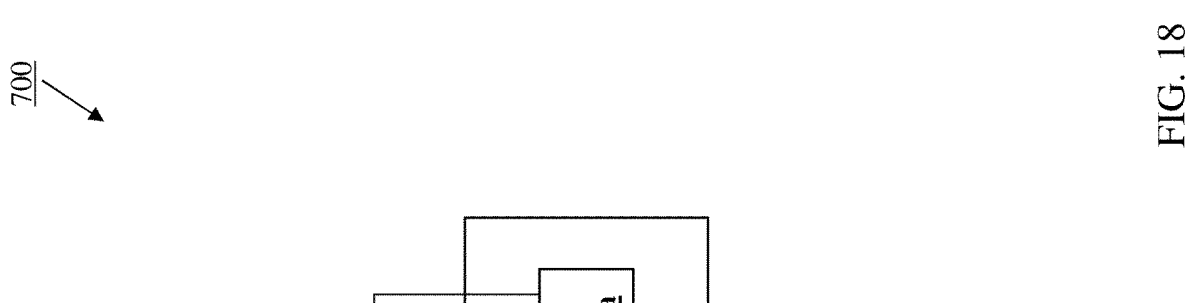
FIG. 18 is a schematic view illustrating an embodiment of the operation of the LCS provisioning system of FIG. 7 during the method of FIG. 8.

As will be appreciated by one of skill in the art in possession of the present disclosure, subsequent data write requests that update the data that was provided in the memory system 704*c* and/or 706 may be handled by the SDS server subsystem 704*b* and the SDS client subsystem 704*a* via similar operations that include the SDS client subsystem 704*a* requesting the data update write via the first TCP/IP connection that was established with the SDS server subsystem 704*b* at block 802, the SDS server subsystem 704*b* instructing the SDS client subsystem 704*a* to perform the data update write, and the SDS client subsystem 704*a* retrieving the data update from the LCS 702 and performing the data update write in the memory system 704*c* and/or 706. Furthermore, as illustrated in FIG. 18, at some point following the storage and/or updating of data written to the memory system 704*c* and/or 706, the SDS server subsystem 704*b* may perform data storage operations 1800 that include retrieving that data from the memory system 704*c* and/or 706, and writing that data to the storage system 710 via the second TCP/IP connection established with the storage system 710 at block 802.

Thus, systems and methods have been described that provide for the optimization of SDS functionality via the discovery and use of local data paths that eliminate the transmission of data via TCP/IP connections to provide data to an SDS client subsystem. For example, the SDS system of the present disclosure may include a memory system, an SDS client subsystem that is coupled to the memory system, and an SDS server subsystem that is coupled to the memory system. The SDS server subsystem determines that the SDS client subsystem and the SDS server subsystem share the memory system, and establishes a first Transmission Control Protocol/Internet Protocol (TCP/IP) connection with the SDS client subsystem. The SDS server subsystem then receives a first data read request via the first TCP/IP connection from the SDS client subsystem, determines the first data read request is associated with data stored in the memory system, and provides a first data read response via the first TCP/IP connection, that is configured to cause the SDS client subsystem to read the data from the memory system. As such, hops in conventional SDS systems via TCP/IP connections that require data copies between IO buffers and networking buffers and that operate to amplify memory and networking bandwidth usage may be eliminated when alternative local data paths are available.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Software Defined Storage (SDS) system, comprising:
a memory system;
a Software Defined Storage (SDS) client subsystem that is coupled to the memory system; and
an SDS server subsystem that is coupled to the memory system and that is configured to:
establish a first Transmission Control Protocol/Internet Protocol (TCP/IP) connection with the SDS client subsystem;
determine that the SDS client subsystem and the SDS server subsystem share the memory system;
receive, via the first TCP/IP connection, a first data read request from the SDS client subsystem;
determine the first data read request is associated with data stored in the memory system; and
provide, via the first TCP/IP connection, a first data read response that is configured to cause the SDS client subsystem to read the data from the memory system.

2. The system of claim 1, wherein the SDS server subsystem is configured to:
receive, via the first TCP/IP connection, a first data write request from the SDS client subsystem; and
provide, via the first TCP/IP connection, a first data write response that is configured to cause the SDS client subsystem to write the data to the memory system.

3. The system of claim 2, wherein the SDS server subsystem is configured to:
write, via a second TCP/IP connection subsequent to the SDS client subsystem writing the data to the memory system, the data from the memory system to a storage system that is coupled to the SDS server subsystem via the second TCP/IP connection.

4. The system of claim 1, wherein the SDS server subsystem is configured to:
receive, via the first TCP/IP connection and prior to receiving the first data read request, a second data read request from the SDS client subsystem;

determine the second data read request is associated with the data that is stored in a storage system that is coupled to the SDS storage server via a second TCP/IP connection;
retrieve, via the second TCP/IP connection, the data from the storage system; and
store the data in the memory system.

5. The system of claim 1, wherein the memory system is located in a device that includes the SDS client subsystem and the SDS server subsystem.

6. The system of claim 1, wherein the memory system is coupled to each of the SDS client subsystem and the SDS server subsystem via a network.

7. An Information Handling System (IHS), comprising:
a Software Defined Storage (SDS) processing system; and
an SDS memory system that is coupled to the SDS processing system and that includes instructions that, when executed by the SDS processing system, cause the SDS processing system to provide an SDS server engine that is configured to:
establish a first Transmission Control Protocol/Internet Protocol (TCP/IP) connection with an SDS client subsystem;
determine that the SDS client subsystem and the SDS server engine share a data storage memory system;
receive, via the first TCP/IP connection, a first data read request from the SDS client subsystem;
determine the first data read request is associated with data stored in the data storage memory system; and
provide, via the first TCP/IP connection, a first data read response that is configured to cause the SDS client subsystem to read the data from the data storage memory system.

8. The IHS of claim 7, wherein the SDS server engine is configured to:
receive, via the first TCP/IP connection, a first data write request from the SDS client subsystem; and
provide, via the first TCP/IP connection, a first data write response that is configured to cause the SDS client subsystem to write the data to the data storage memory system.

9. The IHS of claim 8, wherein the SDS server engine is configured to:
write, via a second TCP/IP connection subsequent to the SDS client subsystem writing the data to the data storage memory system, the data from the data storage memory system to a storage system that is coupled to the SDS server subsystem via the second TCP/IP connection.

10. The IHS of claim 7, wherein the SDS server engine is configured to:
receive, via the first TCP/IP connection and prior to receiving the first data read request, a second data read request from the SDS client subsystem;
determine the second data read request is associated with the data that is stored in a storage system that is coupled to the SDS processing system via a second TCP/IP connection;
retrieve, via the second TCP/IP connection, the data from the storage system; and
store the data in the data storage memory system.

11. The IHS of claim 7, wherein the data storage memory system is located in a device that includes the SDS client subsystem and the SDS server engine.

12. The IHS of claim 7, wherein the data storage memory system is coupled to each of the SDS client subsystem and the SDS server engine via a network.

13. The IHS of claim 7, wherein the first data read response is configured to cause the SDS client subsystem to perform a Direct Memory Access (DMA) operation to read the data from the data storage memory system.

14. A method for optimizing Software Defined Storage (SDS) using a local data path, comprising:

establishing, by an Software Defined Storage (SDS) server subsystem, a first Transmission Control Protocol/Internet Protocol (TCP/IP) connection with an SDS client subsystem;

determining, by a server subsystem, that the SDS client subsystem and the SDS server subsystem share a memory system;

receiving, by the SDS server subsystem via the first TCP/IP connection, a first data read request from the SDS client subsystem;

determining, by the SDS server subsystem, the first data read request is associated with data stored in the memory system; and providing, by the SDS server subsystem via the first TCP/IP connection, a first data read response that is configured to cause the SDS client subsystem to read the data from the memory system.

15. The method of claim 14, further comprising:

receiving, by the SDS server subsystem via the first TCP/IP connection, a first data write request from the SDS client subsystem; and providing, by the SDS server subsystem via the first TCP/IP connection, a first data write response that is configured to cause the SDS client subsystem to write the data to the memory system.

16. The method of claim 15, further comprising:

write, by the SDS server subsystem via a second TCP/IP connection subsequent to the SDS client subsystem writing the data to the memory system, the data from the memory system to a storage system that is coupled to the SDS server subsystem via the second TCP/IP connection.

17. The method of claim 14, further comprising:

receiving, by the SDS server subsystem via the first TCP/IP connection and prior to receiving the first data read request, a second data read request from the SDS client subsystem;

determining, by the SDS server subsystem, the second data read request is associated with the data that is stored in a storage system that is coupled to the SDS server subsystem via a second TCP/IP connection;

retrieving, by the SDS server subsystem via the second TCP/IP connection, the data from the storage system; and storing, by the SDS server subsystem, the data in the memory system.

18. The method of claim 14, wherein the memory system is located in a device that includes the SDS client subsystem and the SDS server subsystem.

19. The method of claim 14, wherein the memory system is coupled to each of the SDS client subsystem and the SDS server subsystem via a network.

20. The method of claim 14, wherein the first data read response is configured to cause the SDS client subsystem to perform a Direct Memory Access (DMA) operation to read the data from the memory system.

* * * * *